US006983946B2

(12) United States Patent
Sullivan et al.

(10) Patent No.: US 6,983,946 B2
(45) Date of Patent: Jan. 10, 2006

(54) TRANSPORTABLE CONTAINERS APPARATUS AND METHOD

(75) Inventors: Hugh C. Sullivan, Carmichael, CA (US); Jeffrey M. Saarman, Mill Valley, CA (US)

(73) Assignee: Porta Plastic Products, Sacramento, CA (US)

( * ) Notice: Subject to any disclaimer, the term of this patent is extended or adjusted under 35 U.S.C. 154(b) by 118 days.

(21) Appl. No.: 10/404,969

(22) Filed: Apr. 1, 2003

(65) Prior Publication Data

US 2004/0195793 A1 Oct. 7, 2004

(51) Int. Cl.
*B65D 21/036* (2006.01)

(52) U.S. Cl. .............................. 280/79.11; 280/33.998; 280/47.18; 220/4.27; 206/511

(58) Field of Classification Search ........... 280/33.998, 280/79.11, 79.2, 47.34, 47.35, 47.19; 206/511, 206/510, 509; 220/1.5, 4.26, 4.27, 592.09, 220/592.25, 23.9, 528, 529, 754
See application file for complete search history.

(56) References Cited

U.S. PATENT DOCUMENTS

| | | | | |
|---|---|---|---|---|
| 3,376,046 A | * | 4/1968 | Kivett et al. ........... | 280/33.998 |
| 4,082,208 A | * | 4/1978 | Lane, Jr. ..................... | 224/629 |
| 4,118,048 A | * | 10/1978 | Spranger et al. ......... | 280/47.35 |
| 4,550,931 A | | 11/1985 | Ziaylek, Jr. | |
| 4,846,485 A | | 7/1989 | Payne | |
| 4,960,149 A | * | 10/1990 | Rizzitiello ................... | 137/205 |
| 5,184,836 A | * | 2/1993 | Andrews et al. ........... | 280/79.5 |
| 5,240,264 A | | 8/1993 | Williams | |
| 5,312,011 A | * | 5/1994 | Fischer ....................... | 220/528 |
| 5,431,428 A | | 7/1995 | Marchwiak | |
| 5,558,254 A | * | 9/1996 | Anderson et al. ........... | 220/527 |
| 5,699,925 A | * | 12/1997 | Petruzzi ..................... | 220/4.27 |
| 6,105,980 A | * | 8/2000 | Cino et al. ............. | 280/33.998 |
| 6,123,344 A | | 9/2000 | Clegg | |
| 6,176,559 B1 | | 1/2001 | Tiramani | |
| 6,199,879 B1 | * | 3/2001 | Cino et al. ............. | 280/33.998 |
| 6,254,112 B1 | | 7/2001 | Clegg | |
| 6,347,847 B1 | | 2/2002 | Tiramani | |
| 6,371,320 B2 | | 4/2002 | Sagol | |
| D456,973 S | | 5/2002 | Kimpel | |
| 6,431,580 B1 | * | 8/2002 | Kady .......................... | 280/655 |
| 6,471,237 B1 | | 10/2002 | Bedsole | |
| 2004/0036239 A1 | * | 2/2004 | King ..................... | 280/33.998 |
| 2005/0006861 A1 | * | 1/2005 | Dubois et al. ......... | 280/33.998 |

OTHER PUBLICATIONS

Office Max newspaper advertisement, wheeled storage containers, p. 6, undated.

(Continued)

*Primary Examiner*—Christopher P. Ellis
*Assistant Examiner*—Jeff Restifo
(74) *Attorney, Agent, or Firm*—Manatt Phelps & Phillips LLP

(57) ABSTRACT

An easily assembled and disassembled combination apparatus is disclosed for the segregated storage and transport of articles. The apparatus comprises at least one vertically stackable and interlockable storage container removably mounted atop a wheeled base and fitted with an adjustable pulling handle. Constructed of reinforced plastic, the durable, fully-enclosed storage container forms the backbone of the invention's novel integrated frame. The container lid can be secured with an elastic band or locked with an inelastic, tamper-evident band. Connectable handle members and a shoulder strap enable the container to be individually moved or carried. Support members can be used to elevate one container above another when ready access to the contents of both containers is desired, or to elevate one container above the ground surface when a cabinet-style configuration is preferred. Other accessories include an insulated container liner, a container partition assembly, a parts caddy, and a wheeled support.

13 Claims, 11 Drawing Sheets

OTHER PUBLICATIONS

Sears Catalog, Craftsman tool chests, p. 5, undated.
Sporty's Tool Shop catalog, folding utility carts, p. 28, undated.
United States Plastic Corp. on-line catalog, Rubbermaid Carts, p. 1 of 1, downloaded Mar. 19, 2003.

* cited by examiner

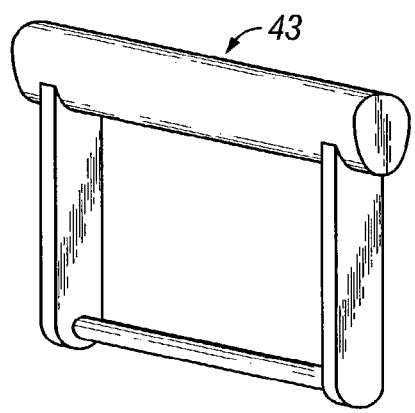
FIG. 5
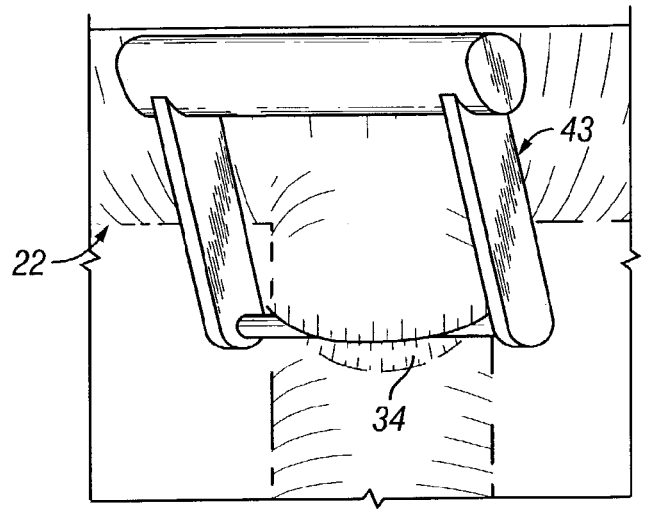
FIG. 5A
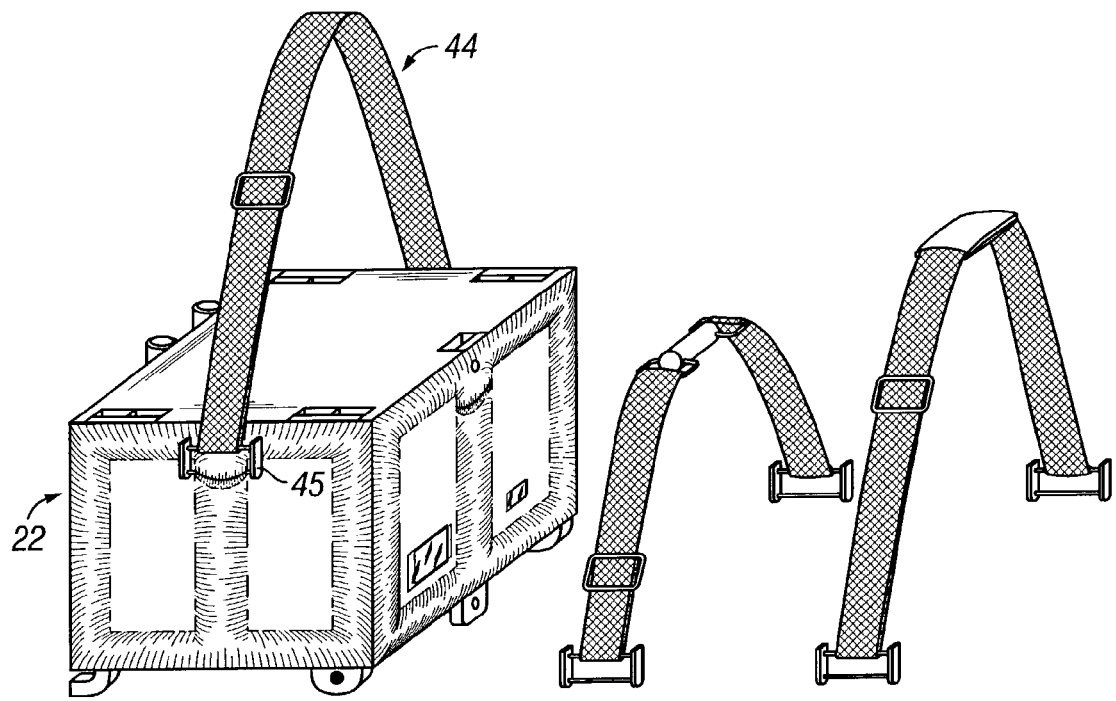
FIG. 6  FIG. 6A  FIG. 6B

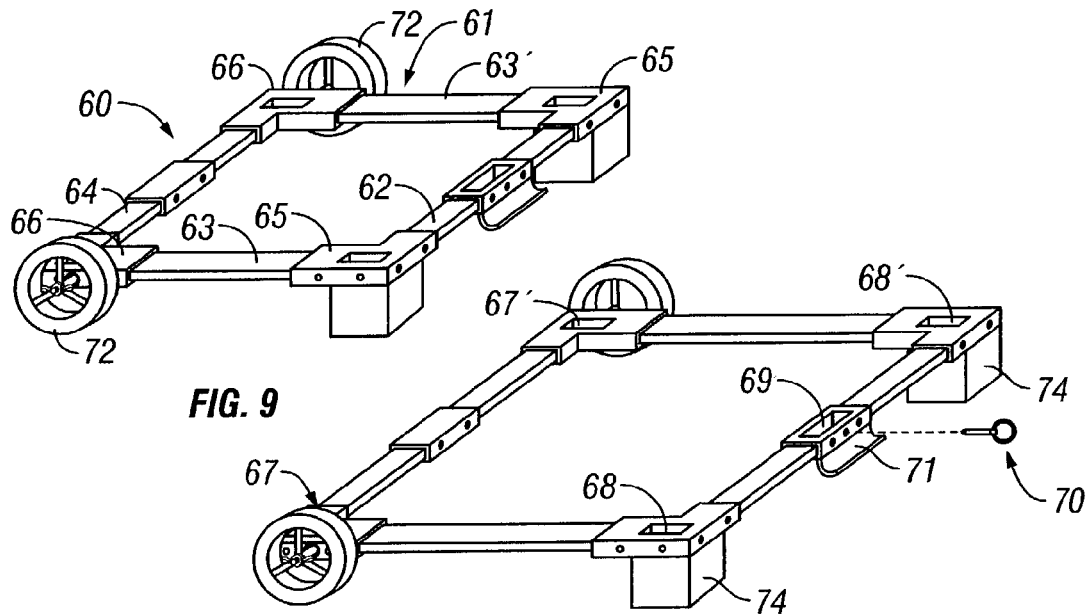
FIG. 9
FIG. 9A
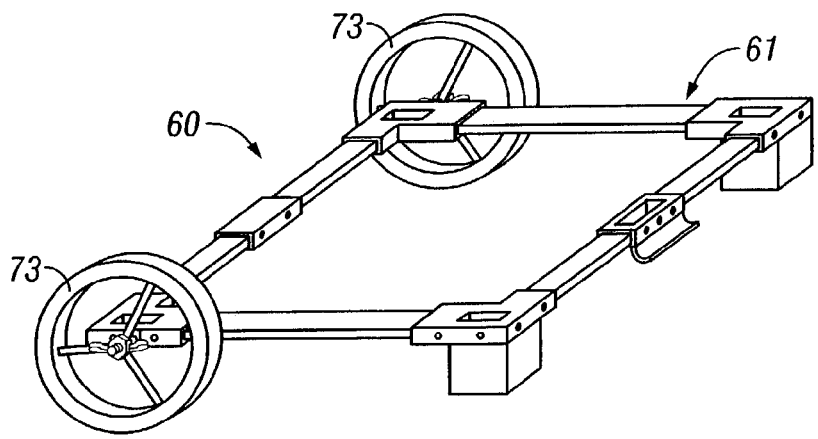
FIG. 10

TRANSPORTABLE CONTAINERS APPARATUS AND METHOD

CROSS-REFERENCE TO RELATED APPLICATIONS

[Not Applicable]

STATEMENT REGARDING FEDERALLY SPONSORED RESEARCH OR DEVELOPMENT

[Not Applicable]

FIELD OF THE INVENTION

This invention relates to an apparatus for storing and transporting articles and, more particularly, to an easily assembled and disassembled combination device comprising a plurality of vertically stackable and interlockable reinforced plastic storage containers, a detachable wheeled base, a detachable pulling handle, and various accessories.

BACKGROUND

For many years, corrugated cardboard containers have been used to store a variety of articles. More recently, containers made of plastic have become popular due, in large part, to their superior durability and moisture resistance. Regardless of the material with which they are constructed, existing storage containers are often transported with the aid of a dolly commonly comprised of an L-shaped frame resting atop a set of wheels. However, the use of such a device to manually transport storage containers can present certain disadvantages.

Unsecured storage containers can fall from a dolly when it is tilted or moved, possibly injuring the user and likely spilling the container contents. However, fastening containers to a dolly can be an awkward and time-consuming process. Frequently-used elastic cords do not altogether prevent containers from shifting and can injure the user if they break loose. Additionally, a considerable amount of lifting force may be required to tilt a loaded dolly from its vertical resting position to an angle suitable for transport. Furthermore, a dolly occupies valuable space and may not fit in a confined area, such as the trunk of a car.

Several types of wheeled devices have been developed in an effort to address the shortcomings of the storage container-dolly configuration. Indeed, the prior art discloses many examples of wheeled containers and carts. Yet none of these inventions are versatile enough to allow for the secure transport of multiple fully-enclosed storage containers over different types of terrain without the need for a bulky frame or separate transporting device.

DESCRIPTION OF THE PRIOR ART

Wheeled container carriers of varying configuration and design are prevalent in the prior art.

For example, U.S. Pat. No. 6,199,879 discloses a rudimentary four-wheeled cart and box apparatus. An obvious disadvantage to this system is that is does not contemplate a handle for manually manipulating the cart over a ground surface. Moreover, the flat-platformed cart is not designed to traverse a curb or staircase as compared to a tilt dolly system.

U.S. Pat. Nos. 6,471,237 and D456,973 disclose wheeled container carriers that address these shortcomings, but present other limitations: they are designed to accomodate only a single container and their metal frames are relatively heavy and take up a considerable amount of space, making them difficult to maneuver and impractical to transport in a vehicle.

U.S. Pat. No. 5,431,428 discloses a carrying case assembly with built-in wheels and a collapsible handle. This device takes up less space and is easier to manipulate than its tubular-framed counterparts. However, like the other single-purpose inventions, it does not provide for articles to be transported in multiple containers. Its small recessed wheels cannot easily traverse uneven terrain. Moreover, the device's composite design makes long-term storage imprudent.

U.S. Pat. No. 4,550,931 discloses a low-profile, horizontally-situated rectangular container, especially suited for storing fire-fighting equipment, with recessed wheels and a telescoping handle stored inside the container bottom. The design allows for additional containers to be vertically stacked atop the base container and secured with built-in external latches. Placement of the handle at the container bottom facilitates removal of the container from the storage compartment of a fire-fighting or rescue vehicle. However, this configuration forces the user to reach down to the ground surface to elevate and tilt the container on its side for movement. This action is certain to displace the container contents and likely to inconvenience the user. While such an apparatus may be useful under limited circumstances, it lacks general utility.

U.S. Pat. No. 5,240,264 discloses a two-wheeled dolly-type apparatus having an inverted U-shaped tubular frame extending through and supporting a set of vertically-stacked storage containers. This device is designed to carry an assortment of items and easier to manipulate than its lower-profiled counterparts. Even so, the placement of wheels at the rear, rather than the side, of the base container requires the user to apply greater force to tilt the apparatus for transport. Also, the folding wheel design is certain to make the apparatus unstable during movement, especially while traversing stairs where lateral forces are implicated. The fact that all of the stacked containers are collectively secured by the tubular frame and cannot be separated without completely disassembling the apparatus reveals, perhaps, a more significant design flaw.

U.S. Pat. No. 6,176,559 discloses a vertically-situated rolling containers assembly comprising a wheeled base cabinet having a detachable handle member, and at least one cabinet removably mounted atop the base cabinet with external latches. The device's side-mounted wheels provide enhanced maneuverability. However, since the wheels and handle member are attached to the base cabinet, the base cabinet must be utilized for transport even if the articles stored therein are not needed. Partitions found throughout the storage areas restrict the size and number of articles that may be stored, further diminishing the assembly's versatility. Since the base cabinet is of fixed dimension, only a container of corresponding size may be stacked thereon. This design may prove undesirable, especially where articles must be transported through narrow corridors.

U.S. Pat. No. 6,347,847 discloses a rolling containers assembly essentially similar to that disclosed in the '559 patent, a notable difference being that the handle member described in the '847 patent is attached to the top cabinet rather than the base cabinet.

U.S. Pat. No. 6,371,320 discloses a portable workshop container assembly essentially similar to the rolling containers assembly disclosed in the '559 patent, a notable difference being that the base container described in the '320 patent has an integrated swivel wheel at the midpoint of the side opposite the main wheels. This additional wheel is intended to make it possible to push the portable workshop in an erect state when heavily laden. However, the small swivel wheel is of little use on uneven terrain and, as a practical matter, it is unlikely that a user would push, rather than pull, the portable workshop over a great distance.

U.S. Pat. No. 4,846,485 discloses an apparatus for storing and transporting photographic equipment, comprising at least one storage container, a wheeled base, and a dolly with an extensible handle. While the heavy guage steel apparatus may be desirable for supporting and transporting photographic equipment, it is not lightweight enough for general application. Moreover, the apparatus utilizes nuts and bolts to secure the containers to the wheeled base and dolly, making assembly and disassembly inconvenient and time-consuming. Finally, the dolly portion of the apparatus is external to the containers and requires storage space of its own.

U.S. Pat. Nos. 6,123,344 and 6,254,112 disclose a transportable file case holder comprised of an L-shaped frame member having a detachable wheel assembly and a plurality of vertically spaced-apart mounting brackets to accomodate a corresponding number of stackable storage containers that are open on one side. A cursory review of the invention reveals several design flaws. An obvious disadvantage is that the storage containers are not fully-enclosed, thus precluding use of the apparatus in inclement weather. The absence of a side wall necessitates that the containers be placed on their backs when transported to avoid spillage of the contents. Such placement could damage the mounting brackets on the backs of the storage containers and may prove difficult, if not impossible, given that the container handles are horizontally situated. When the containers are assembled together with the frame member, their contents are held in place only with a single elasticized cord, making it likely that loose or smaller items will escape from the open side of the containers. Because the containers have fixed center shelves, storage is limited to flat-profiled items that must be stored horizontally. Moreover, the size and number of containers that may be utilized is limited by the dimensions of the vertical aspect of the frame member, which, by virtue of its size, could be difficult to transport in the trunk of a car. Finally, placement of wheels to the rear rather than to the side of the frame member requires the user to apply greater force to tilt the apparatus for transport.

In view of the foregoing disadvantages inherent in the known types of wheeled container carriers now present in the prior art, there is an unmet need for an easily assembled and disassembled apparatus suited for storing articles within multiple fully-enclosed storage containers which can be safely and securely transported over different types of terrain without the need of a bulky frame or separate transporting device.

SUMMARY OF THE INVENTION

The invention is directed to an improved combination apparatus designed to safely, securely, and efficiently store and transport articles. In a preferred embodiment, the apparatus is primarily comprised of at least one vertically stackable and interlockable fully-enclosed storage container, an attachable and interlockable wheeled base, and an attachable pulling handle. Accessories include connectable storage container handle members, a connectable storage container shoulder strap, bands designed to secure and lock the storage container lid, support members designed to connect with and securely elevate one storage container above another or the ground surface, a parts caddy, a thermally-insulated storage container liner, a storage container partition assembly, and a connectable wheeled support. Wherever possible, the apparatus utilizes removeable and replaceable parts. Conversely, many prior art designs incorporate fixed hardware that can break off, sometimes rendering a device totally useless.

The salient feature of the invention is its versatile storage container. Constructed of reinforced plastic, the container walls and tightly-sealing lid are strong, durable, and moisture-resistant. Unlike its cardboard and unreinforced plastic counterparts, this container will resist collapse under the weight of several like containers or other heavy items. It is designed to provide many years of deterioration-free service and protect the articles stored within from the elements. Moreover, the container is equipped with intrinsic hardware that allows it to be vertically attached and locked to like containers or a wheeled base. The combination of at least one such storage container with a wheeled base and a pulling handle yields an apparatus having a unique integrated frame that eliminates the need for a separate dolly and tie-downs, and virtually eliminates the likelihood that a container will topple during transport.

Accessories augment the storage container's utility. For example, handle members and a shoulder strap connectable with notches on the container exterior allow it to be easily moved or carried. The detachment of these grasping components yields a substantially planar container that occupies less storage space. Also connectable with the aforementioned notches is an elastic band designed to secure the container lid, or an inelastic tamper-evident band designed to lock the lid. Support members can be used to elevate one storage container above another when ready access to the contents of both containers is desired, or to elevate one storage container above the ground surface when a cabinet-style configuration is preferred. A caddy designed to hold such accessories can be securely attached atop and locked to the storage container. The addition of a thermally-insulated liner converts the storage container into a makeshift cooler. The addition of a partition assembly ensures that items such as bottles remain upright, segregated, and protected from breakage. Finally, a wheeled support can be connected to a stack of storage containers secured to a wheeled base in order to safely stabilize the resulting apparatus in a tilted orientation, particularly when heavily laden.

Further features and advantages of the present invention will be readily apparent from the following specification and accompanying drawings.

BRIEF DESCRIPTION OF THE DRAWINGS

For a better understanding of the invention, reference is made to the attached drawings in which:

FIG. 5 is a front perspective view of a storage container handle member according to the present invention.

FIG. 5A illustrates the handle member of FIG. 5 attached to the body of the storage container of FIG. 1.

FIG. 6 illustrates the storage container of FIG. 1 with an attached removeable shoulder strap according to the present invention.

FIGS. 6A and 6B illustrate alternate embodiments of the shoulder strap of FIG. 6.

FIG. 9 is a side perspective view of a wheeled base according to the preferred embodiment of the present invention.

FIG. 9A illustrates the wheeled base of FIG. 9 with its front, rear, and side members horizontally expanded.

FIG. 10 illustrates the wheeled base of FIG. 9 with alternate, larger-dimension wheels.

DETAILED DESCRIPTION OF THE INVENTION

The present invention relates to an easily assembled and disassembled combination apparatus for the segregated storage and transport of articles. Its primary novelty lies in a unique integrated frame design based on the interaction between vertically stackable and interlockable reinforced plastic storage containers, a detachable wheeled base, and a detachable pulling handle. The preferred embodiment of the invention is represented in FIGS. 1 through 16.

Figure 1:
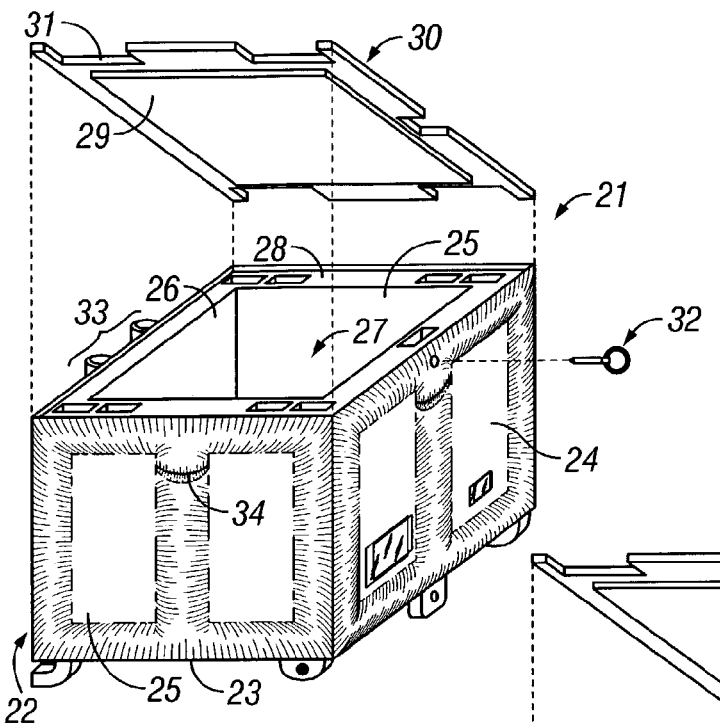
FIG. 1 is a side perspective view of a storage container along with its lid and locking means according to the present invention.

FIG. 1 illustrates features of a reusable storage container, the fundamental element of the invention. As shown, storage container 21 has a generally rectangular body 22 comprising a bottom wall 23, a front wall 24, a pair of opposed side walls 25 and 25', and a rear wall 26 defining a cavity 27 in which articles can be stored. The body 22 has a recessed inner peripheral rim 28 at the opening of cavity 27 upon which a rectangular lid 30 is designed to rest, flush with the top of the container walls. The lid 30 has a projecting center portion 29 designed to be received by and to tightly seal cavity 27, thus securing the articles stored within. It also has a number of rectangular cutouts 31 along its perimeter to expose rectangular slots in the storage container body, discussed below. The single-piece body 22 and single-piece lid 30, both constructed of reinforced plastic through an injection molding process, together form a storage container 21 that is stronger and more durable than those fabricated using separate panels joined together at vulnerable seams, and others constructed of cardboard or unreinforced plastic. The design of the storage container ensures that it will resist collapse under the weight of several like containers or other heavy items and that it will provide many years of deterioration-free service, thus protecting the articles stored within from crushing and from the elements. The container's reinforced walls form the backbone of the invention's novel integrated frame.

Other features are evident on the exterior walls of storage container 21. Front wall 24 has a locking means 32 for attaching and securing a like storage container atop storage container 21. Rear wall 26 has an integrated receiving port 33 designed to receive an adjustable pulling handle or a wheeled support, discussed below. Front wall 24, side walls 25 and 25', and rear wall 26 each have a notch 34 designed to receive a handle member, shoulder strap bracket, elastic lid-securing band, or inelastic tamper-evident lid-locking band, discussed below. These impervious grooves are more favorable than the holes in some prior art storage container walls through which the container contents could escape or through which dust, water, insects, and small rodents could enter.

Figure 2:
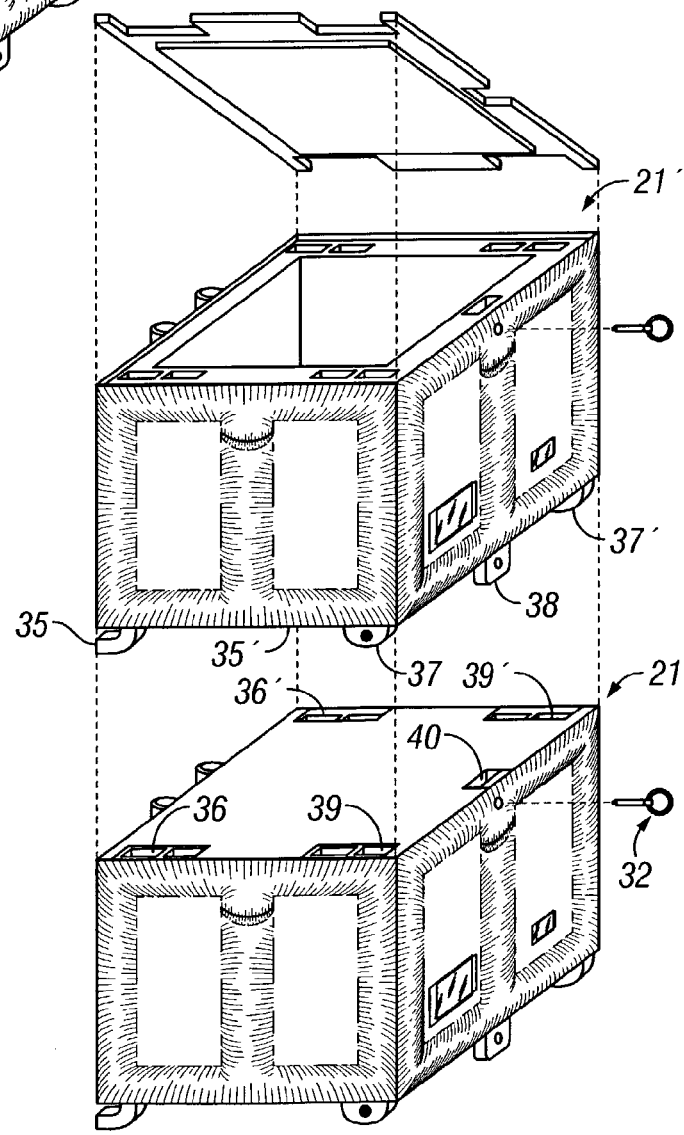
FIG. 2 illustrates the manner in which the storage container of FIG. 1 can be vertically mounted atop a like storage container.

FIG. 2 illustrates additional features of storage container 21 and shows the manner in which a like storage container 21' can be vertically mounted atop storage container 21. Projecting downward from the bottom of storage container 21' are curved members 35 and 35', which are designed to initially engage with rectangular slots 36 and 36' in the body of storage container 21. Connecting components 37, 37', and 38 at the bottom of storage container 21' are designed to subsequently engage with rectangular slots 39, 39', and 40 in the body of storage container 21. Once the two storage containers have been attached, they can be secured together by engaging locking means 32 of storage container 21 with connecting component 38 of storage container 21'. Multiple like storage containers can be secured together in this manner, making efficient use of space and reducing the likelihood that the containers will topple in storage or transport. Because of their uniform height, the curved members and connecting components described above can act as legs to elevate a storage container or stack of containers above the ground surface, thus minimizing contact with dust and water.

Figure 3:
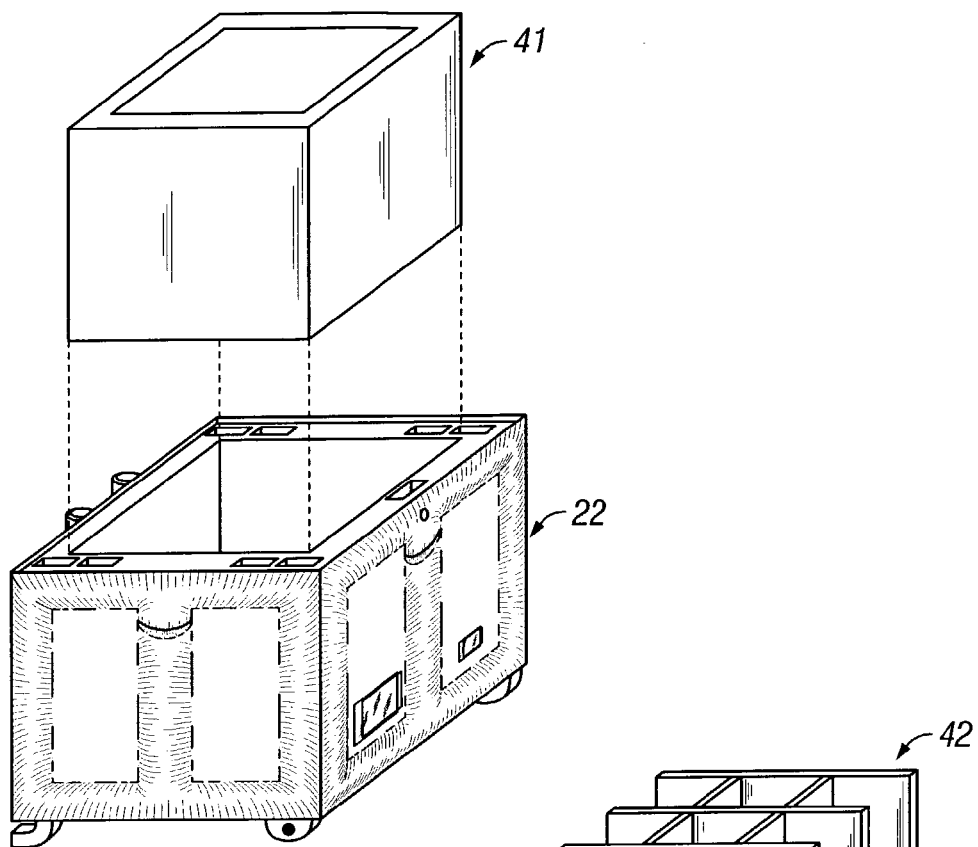
FIG. 3 illustrates the manner in which a thermally-insulated liner according to the present invention can be positioned inside the storage container of FIG. 1.
Figure 4:
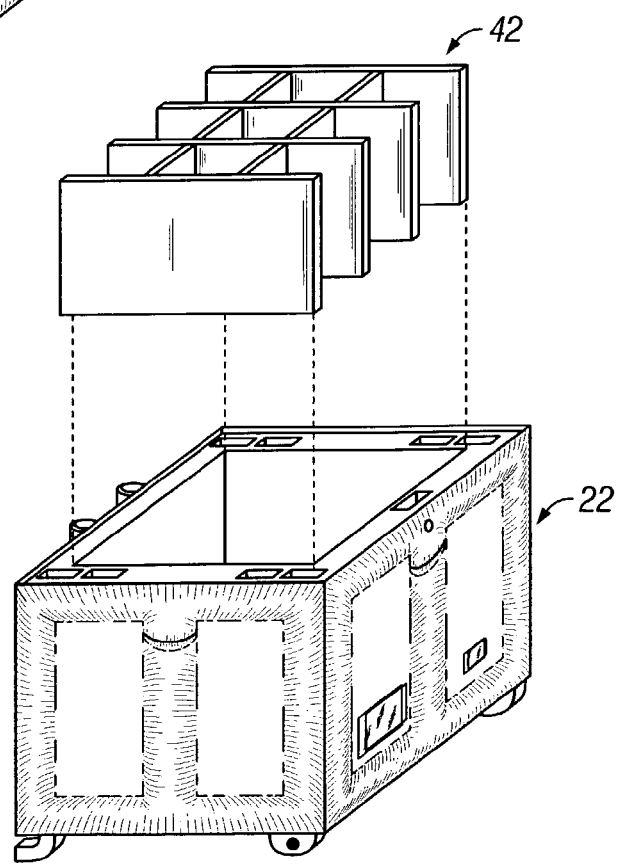
FIG. 4 illustrates the manner in which a partition assembly according to the present invention can be positioned inside the storage container of FIG. 1.

FIG. 3 shows the manner in which a thermally-insulated liner 41 can be positioned inside a storage container body 22 to maintain the temperature of cooled or heated items subsequently placed therein. FIG. 4 shows the manner in which a partition assembly 42 can be placed inside a storage container body 22 to ensure that items such as bottles remain upright, segregated, and protected from breakage.

Figure 7:
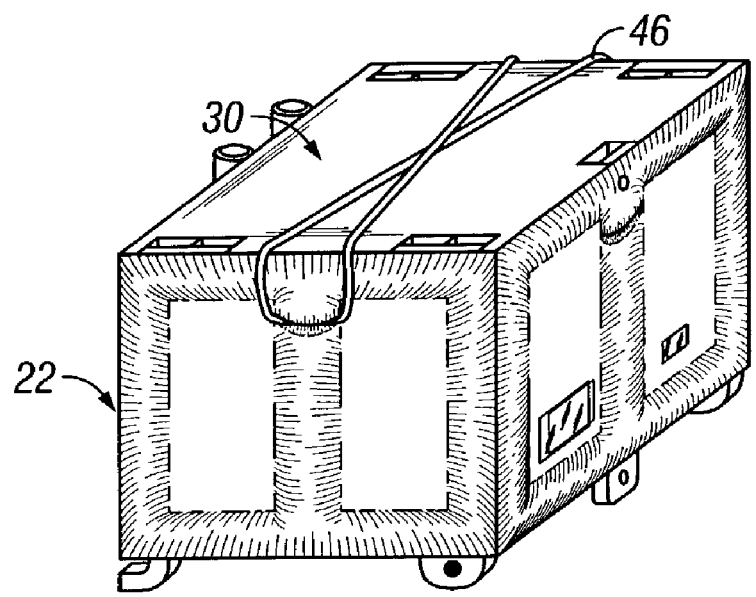
FIG. 7 illustrates the lid of the storage container of FIG. 1 secured with a removable elastic band according to the present invention.
Figure 8:
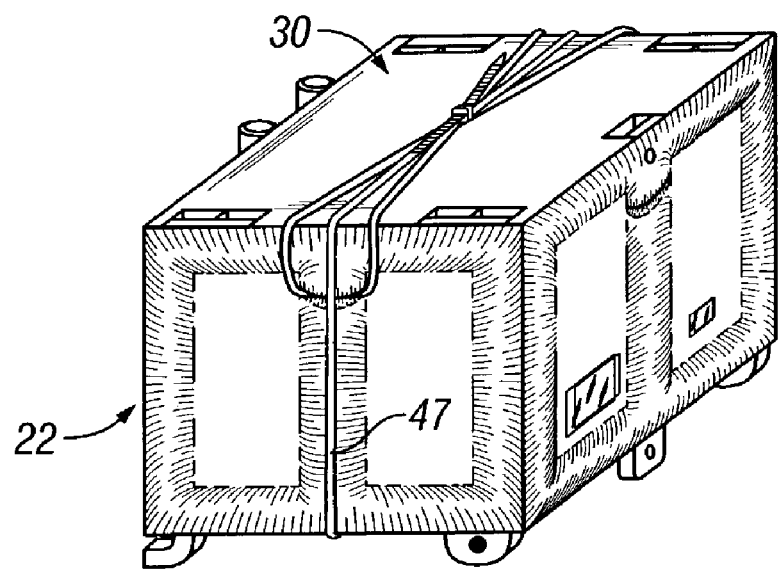
FIG. 8 illustrates the lid of the storage container of FIG. 1 locked with a removable inelastic tamper-evident band according to the present invention.

FIG. 5 illustrates the general design of a handle member 43 and FIG. 5A shows the manner in which it can be attached to a notch 34 on the exterior of the storage container body 22. FIG. 6 shows the manner in which a shoulder strap 44 can be attached to storage container body 22 by means of a bracket 45. FIGS. 6A and 6B illustrate alternate embodiments of the shoulder strap of FIG. 6. These interchangeable accessories enhance the storage container's versatility and can be easily removed to maintain the storage container's substantially planar exterior where storage space is limited, as in a narrow closet or the trunk of a car. FIG. 7 illustrates the manner in which an elastic band 46 can be used to secure a lid 30 to the storage container body 22. FIG. 8 illustrates the manner in which an inelastic tamper-evident band 47 can be used to lock a lid 30 to the storage container body 22. Both bands are designed to be thin enough that they will not interfere with the mounting of one storage container atop another.

FIG. 9 illustrates features of a wheeled base 60, upon which at least one storage container 21 may be mounted and secured. Constructed of a lightweight, durable material, frame 61 comprises a front member 62, a pair of opposed side members 63 and 63', and a rear member 64 joined together by two pairs of L-shaped corner brackets 65 and 66. The frame members are adjustable lengthwise, as depicted in FIG. 9A, to accomodate storage containers of varying size. Rectangular slots 67 and 67' are designed to engage curved members 35 and 35' of storage container 21 while rectangular slots 68, 68', and 69 are designed to engage connecting components 37, 37', and 38 of storage container 21, thus attaching base 60 to storage container 21. A locking means 70 can be engaged to securely lock base 60 to storage container 21. Front member 62 has a curved toehold 71 to allow base 60 to be stabilized by the user's foot when storage containers are detached therefrom. Attached to corner brackets 66 are a pair of removeable wheels 72 to permit rolling movement of the resulting combination apparatus when it is tilted. Placement of the wheels at the sides of the frame, rather than to the rear as in some prior art designs, ensures that less manual force is needed to tilt the resulting apparatus for transport. Moreover, these wheels 72 can be interchanged with larger wheels 73, as depicted in FIG. 10, for ease in traversing curbs, staircases, or rough terrain. A block 74 is mounted beneath each of corner brackets 68 and 68' to prevent rolling movement of the resulting apparatus when upright.

Figure 11:
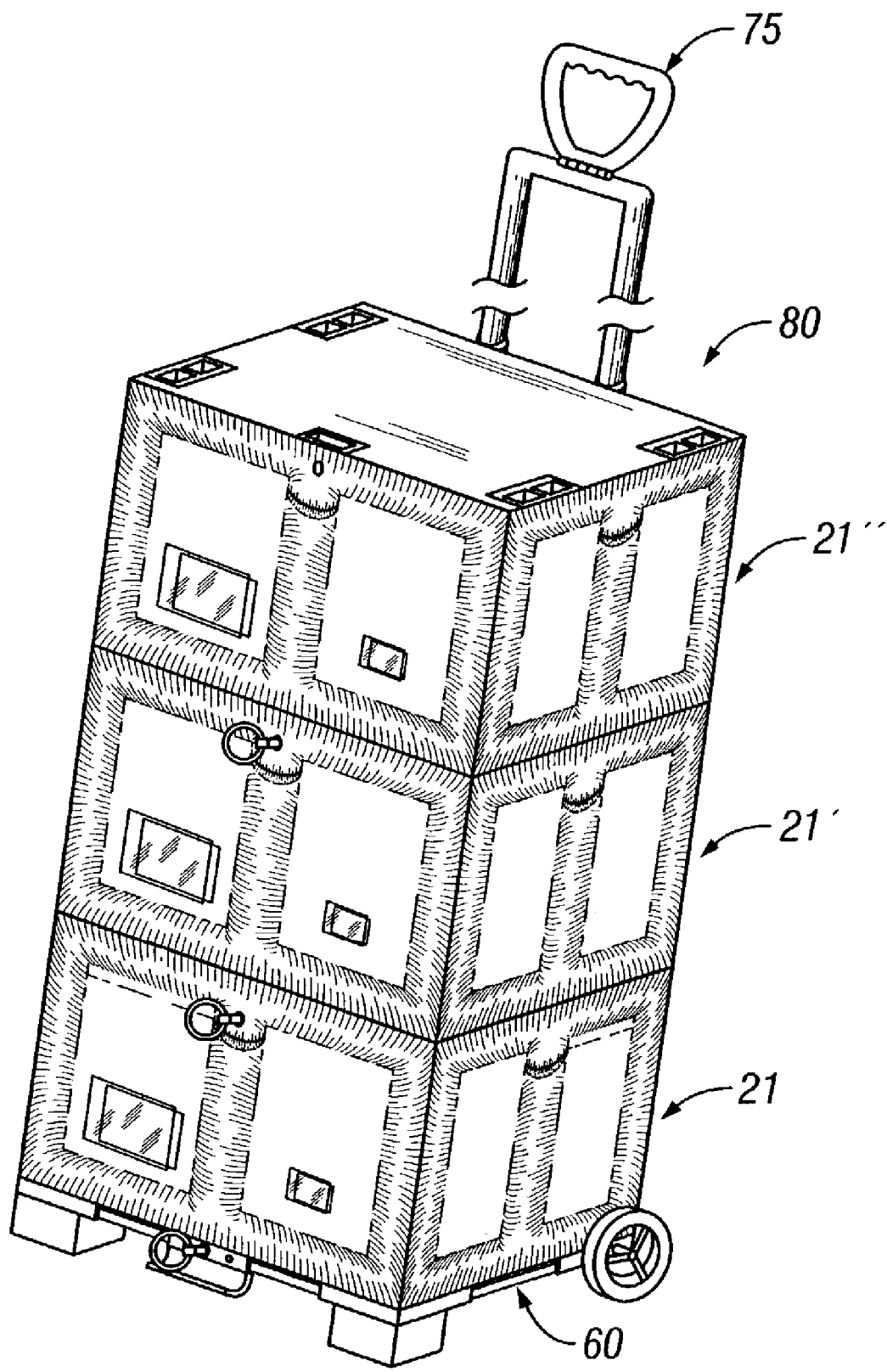
FIG. 11 is a front perspective view of an assembled transportable containers apparatus according to the preferred embodiment of the present invention.

FIG. 11 illustrates the basic combination apparatus 80 in its upright assembled state, comprising a plurality of vertically stacked storage containers 21, 21', and 21" removably mounted atop a wheeled base 60 and fitted with an adjustable pulling handle 75.

Figure 12:
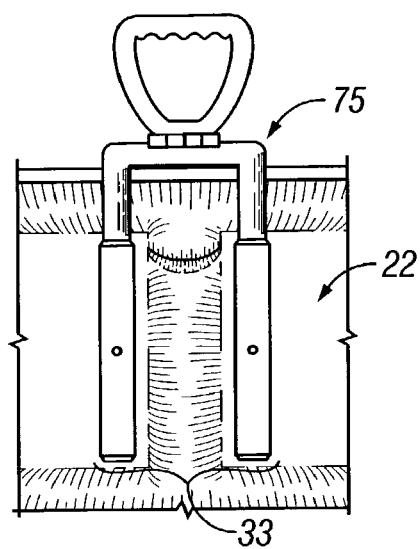
FIG. 12 is a partial rear elevational view of the storage container of FIG. 1 with an attached pulling handle according to the present invention.
Figure 12A:
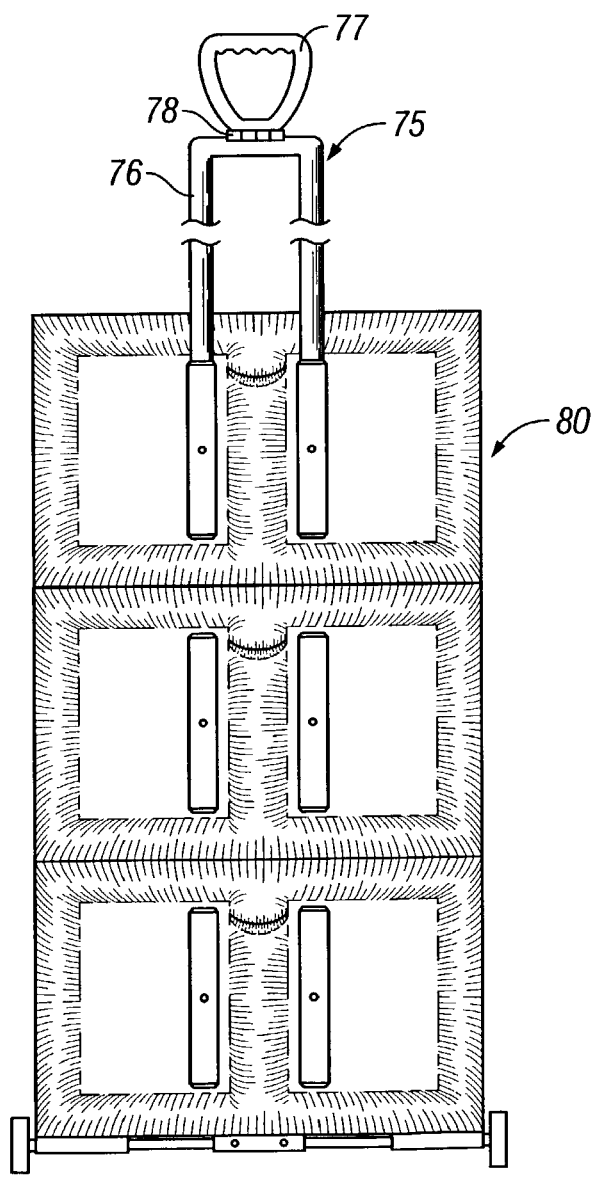
FIG. 12A is a rear elevational view of the transportable containers apparatus of FIG. 11 featuring its adjustable pulling handle.

FIG. 12 illustrates pulling handle 75 attached to the receiving port 33 of storage container body 22. Constructed of a lightweight, durable material, the telescoping shaft 76 of pulling handle 75, shown in FIG. 12A, can be easily configured to the most suitable length based on the number of storage containers being moved and the height of the user. This adjustability overcomes the failings of fixed-length handles in the prior art which can cause inconvenience or strain to the user. A hand grip 77 attached to the telescoping shaft 76 with a hinge 78 allows the user to maintain control of the resulting combination apparatus 80.

Figure 13:
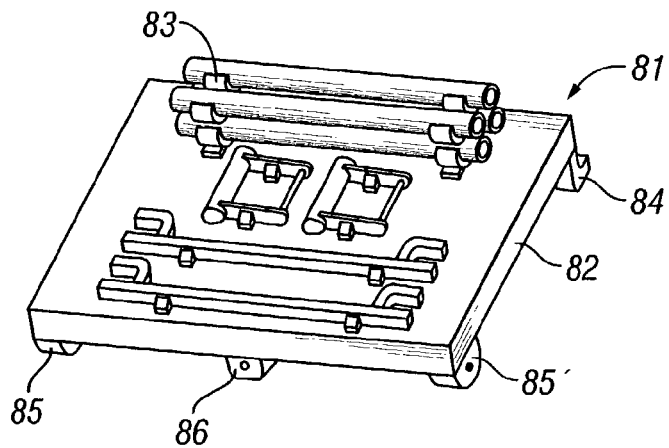
FIG. 13 is a top perspective view of a parts caddy according to the present invention.
Figure 14:
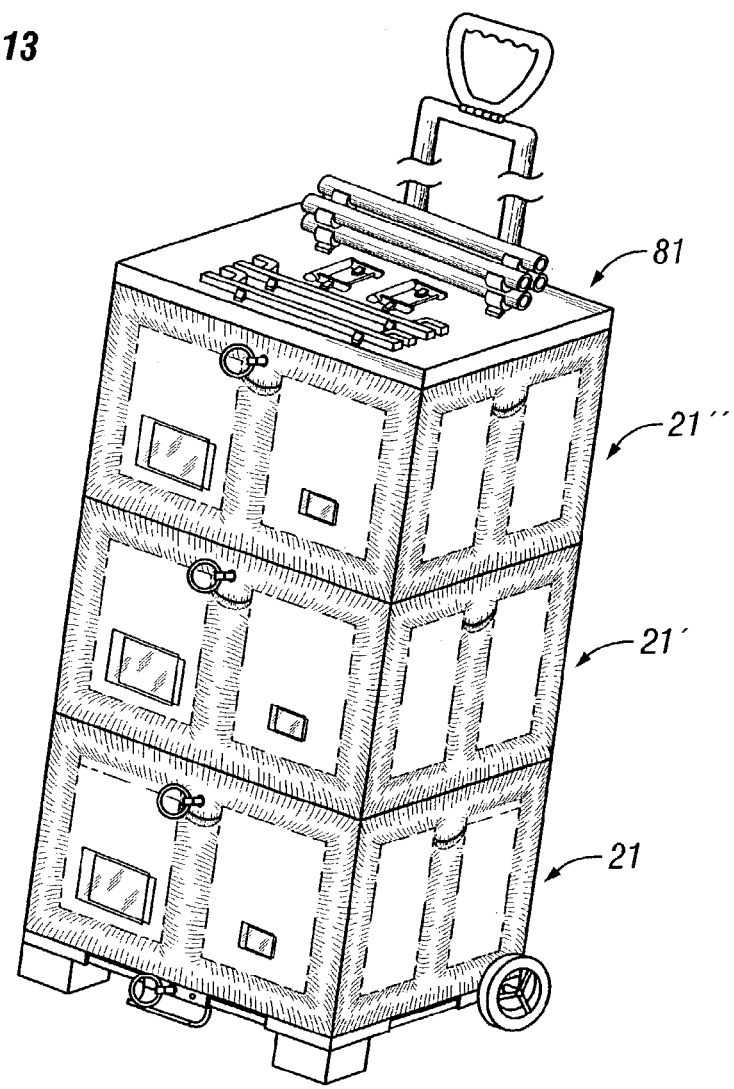
FIG. 14 is a front perspective view of the parts caddy of FIG. 13 mounted atop the transportable containers apparatus of FIG. 11.

FIG. 13 illustrates features of a parts caddy 81 designed to be mounted and secured atop at least one storage container 21 as shown in FIG. 14. The caddy 81 comprises a substantially flat base 82 having clamps 83 on its top surface for securing various combination apparatus 80 accessories, and curved members 84 and connecting components 85, 85', and 86 on its bottom surface identical to those found on the bottom of storage container body 22 and designed to engage with rectangular slots 36, 36', 39, 39', and 40 in the top of storage container body 22 in the same manner that two like storage containers 21 and 21' are vertically mounted together.

Figure 15:
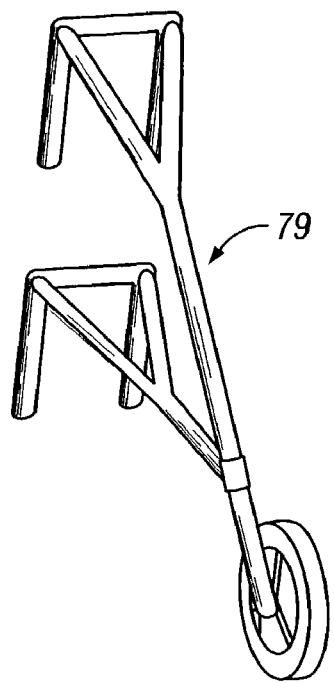
FIG. 15 is a rear perspective view of a wheeled support according to the present invention.
Figure 16:
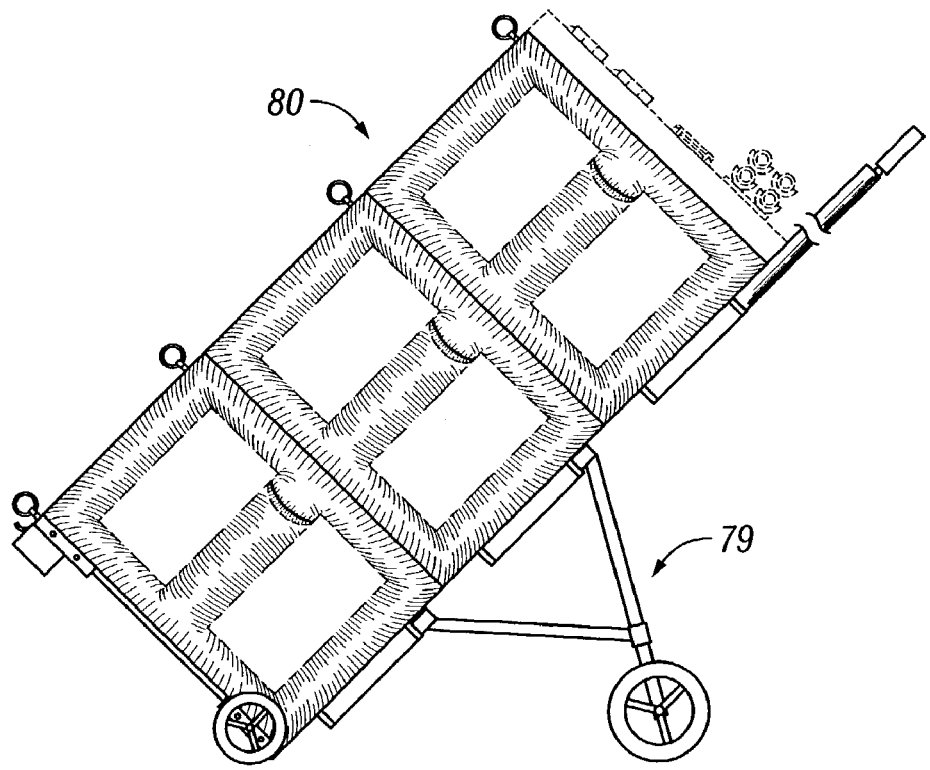
FIG. 16 is a side elevational view of the wheeled support of FIG. 15 attached to the transportable containers apparatus of FIG. 11.

FIG. 15 illustrates features of a wheeled support means 79 designed to stabilize the combination apparatus 80 in a tilted orientation during movement as shown in FIG. 16.

An alternate embodiment of the present invention is represented in FIGS. 1 through 4 and 17 through 18. FIGS. 1 and 2 illustrate features of a storage container 21 as described above. FIG. 2 also shows the manner in which a like storage container 21' can be vertically mounted atop storage container 21. FIG. 3 shows the manner in which a thermally-insulated liner 41 can be positioned inside storage container body 22 to maintain the temperature of cooled or heated items subsequently placed therein. FIG. 4 shows the manner in which a partition assembly 42 can be placed inside storage container body 22 to ensure that items such as bottles remain upright, segregated, and protected from breakage.

Figure 17:
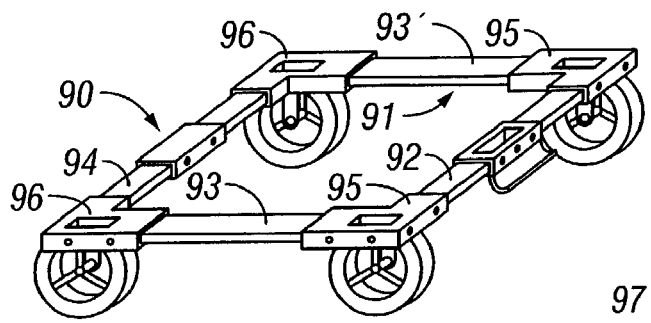
FIG. 17 is a side perspective view of a wheeled base according to an alternate embodiment of the present invention.
Figure 17A:
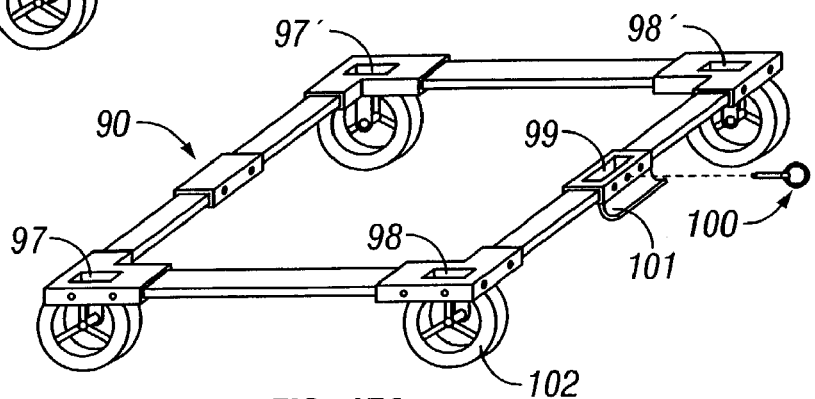
FIG. 17A illustrates the wheeled base of FIG. 17 with its front, rear, and side members horizontally expanded.
Figure 18:
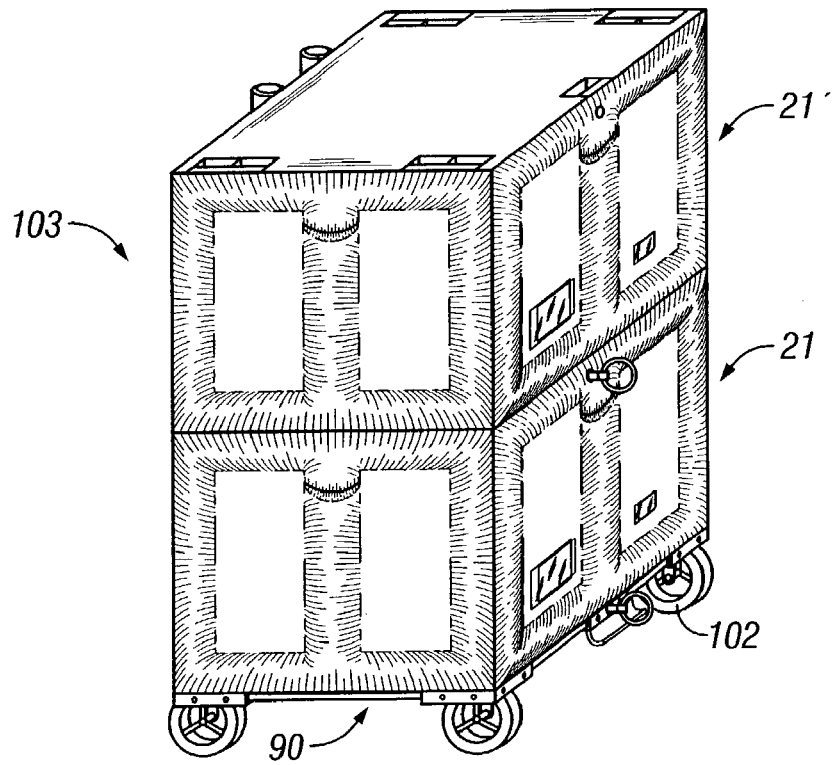
FIG. 18 illustrates the wheeled base of FIG. 17 with the storage container of FIG. 1 attached vertically thereon.

FIG. 17 illustrates features of an alternate wheeled base 90 upon which at least one storage container 21 may be mounted and secured as shown in FIG. 18. Like the wheeled base 60 shown in FIG. 9, the alternate wheeled base 90 has a lightweight, durable frame 91 comprising a front member 92, a pair of opposed side members 93 and 93', and a rear member 94 joined together by two pairs of L-shaped corner brackets 95 and 96. The frame members are adjustable lengthwise, as depicted in FIG. 9A, to accomodate storage containers of varying size. Rectangular slots 97 and 97' are designed to engage curved members 35 and 35' of storage container 21 while rectangular slots 98, 98', and 99 are designed to engage connecting components 37, 37', and 38 of storage container 21, thus attaching base 90 to storage container 21. A locking means 100 can be engaged to securely lock base 90 to storage container 21. Front member 92 has a curved toehold 101 to allow base 90 to be stabilized by the user's foot when storage containers are detached therefrom. The alternate wheeled base 90 differs in that it is supported by at least four fixed wheels 102 mounted beneath frame 91, yielding a rolling cabinet-style apparatus 103.

Another embodiment of the present invention is represented in FIGS. 1 through 4 and 19 through 20. FIGS. 1 and 2 illustrate features of a storage container 21 as described above. FIG. 2 also shows the manner in which a like storage container 21' can be vertically mounted atop storage container 21. FIG. 3 shows the manner in which a thermally-insulated liner 41 can be positioned inside storage container body 22 to maintain the temperature of cooled or heated items subsequently placed therein. FIG. 4 shows the manner in which a partition assembly 42 can be placed inside storage container body 22 to ensure that items such as bottles remain upright, segregated, and protected from breakage.

Figure 19:
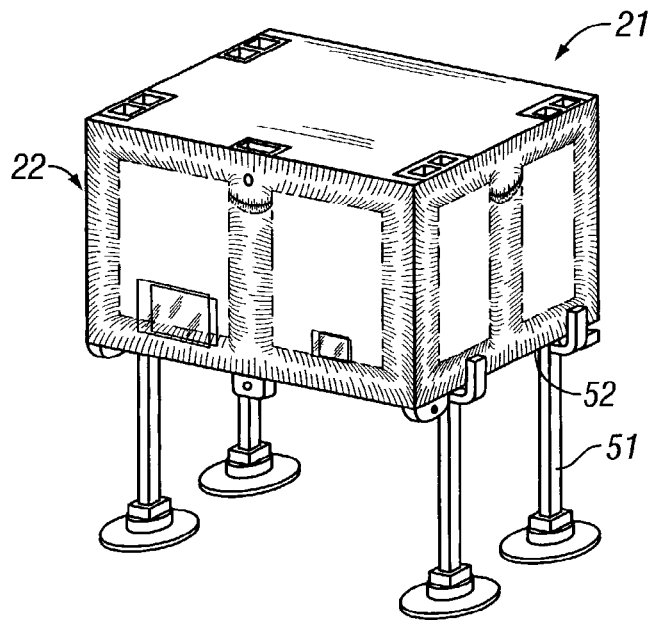
FIG. 19 illustrates the the storage container of FIG. 1 elevated above the ground surface with stationary support members according to the present invention.
Figure 20:
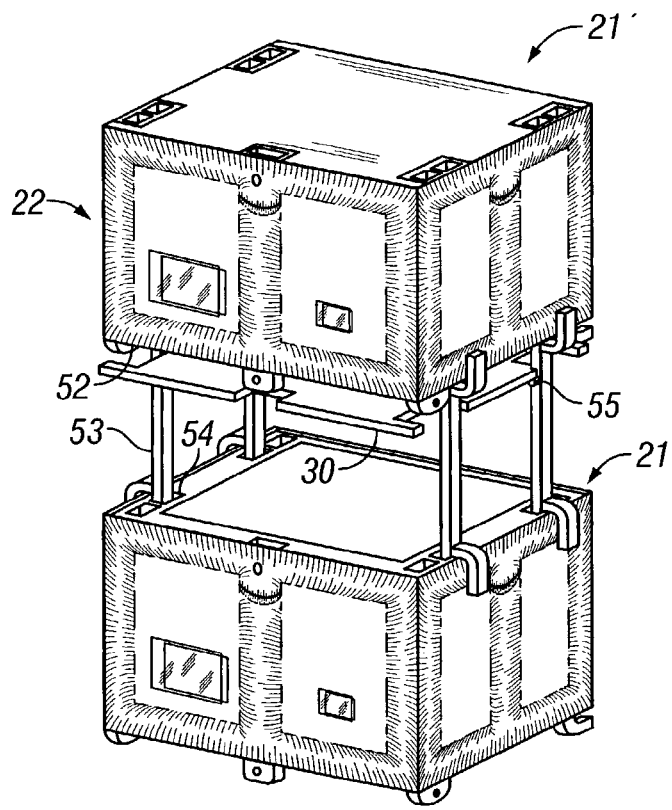
FIG. 20 illustrates the the storage container of FIG. 1 elevated above a like storage container with stationary support members according to the present invention.

FIG. 19 shows the manner in which a storage container 21 can be elevated above the ground surface by means of stationary support members 51 that are manually engageable with rectangular openings 52 in the storage container body 22. This allows for a cabinet-style configuration. FIG. 20 shows the manner in which a storage container 21' can be elevated above a like storage container 21 by means of stationary support members 53 that are manually engageable between rectangular openings 52 in storage container body 22' and rectangular openings 54 in storage container body 22. The support members 53 have means 55 for suspending the lid 30 of storage container 21. This configuration allows ready access to the contents of both storage containers.

METHOD

The following basic method may be used to assemble the preferred embodiment of the combination apparatus: (i) insert curved members 35 and 35' of storage container 21 at an angle into rectangular slots 67 and 67' of rectangular base 60; (ii) lower the front of storage container 21 until its connecting components 37, 37', and 38 fully engage with rectangular slots 68, 68', and 69 of rectangular base 60; (iii) position lid 30 upon peripheral rim 28 of storage container body 22; (iv) optionally vertically stack a second storage container 21' atop the first storage container 21 by inserting curved members 35 and 35' of the second storage container 21' at an angle into rectangular slots 36 and 36' of the first storage container 21, then lower the front of the second storage container 21' until its connecting components 37, 37', and 38 fully engage with rectangular slots 39, 39', and 40 of the first storage container 21, and then position a second lid 30' upon peripheral rim 28 of the second storage container body 22'; (v) optionally repeat step iv with additional storage containers and lids; (vi) optionally vertically stack parts caddy 81 atop the uppermost storage container by inserting curved members 84 of the parts caddy 81 at an angle into rectangular slots 36 and 36' of the uppermost storage container, then lower the front of the parts caddy 81 until its connecting components 85, 85', and 86 fully engage with rectangular slots 39, 39', and 40 of the uppermost storage container, and then secure the apparatus parts using clamps 83 of the parts caddy 81; (vii) engage locking means 70 of rectangular base 60 and locking means 32 of the storage containers in order to secure the storage containers to the rectangular base and to each other; (ix) insert pulling handle 75 into receiving port 33 of the uppermost storage container; and (x) optionally engage wheeled support 79 for stability of the apparatus 80 in transport. Disassembly is accomplished by essentially reversing the aforementioned steps.

While the invention has been disclosed in certain embodiments, the scope of the invention is not intended to be limited thereby and such other embodiments as may be suggested by the teachings herein are particularly reserved, especially as they fall within the breadth and scope of the following claims.

What is claimed is:

1. A vertically stackable storage container, comprising:
a body having a bottom wall, a front wall, a pair of opposed side walls, and a rear wall defining a cavity in which articles can be stored, said rear wall including at least one integrated receiving port extending vertically across its exterior surface;
a curved member projecting downward from the bottom of each of said side walls, adjacent to said rear wall;
a side connecting component projecting downward from the bottom of each of said side walls, adjacent to said front wall;
a front connecting component projecting downward from the bottom of said front wall;
a plurality of primary receiving slots at the top of and within each of said front and side walls, adapted for operative association with said curved members and connecting components of a like, superjacent storage container;
a plurality of secondary receiving slots a the top of and within each of said side walls, adapted for operative association with manually engageable support members;
a plurality of secondary receiving slots at the bottom of and within each of said side walls, adapted for operative association with manually engageable support members; and
a locking means for releasably securing said storage container to a like, superjacent storage container.

2. A vertically stackable storage container as specified in claim 1, further comprising:
a lid adapted for operative association with said body; and
means for securing said lid to said body.

3. A vertically stackable storage container as specified in claim 2, further comprising means for manually grasping said storage container.

4. A vertically stackable storage container as specified in claim 3, further comprising a partition assembly which can be positioned inside said cavity of said storage container to maintain a plurality of upright items in a generally upright position during storage and transport.

5. A vertically stackable storage container as specified in claim 3, further comprising a generally rigid liner of impermeable insulating material which can be positioned inside said cavity of said storage container to inhibit temperature change of cooled or heated items placed therein.

6. A vertically stackable storage container as specified in claim 3, further comprising generally rigid liner of impermeable insulating material which can be positioned inside said cavity of said storage container to inhibit temperature change of cooled or heated items placed therein; and
a partition assembly which can be positioned inside said liner of said storage container to maintain a plurality of temperature sensitive items in a generally upright position during storage and transport.

7. A combination apparatus for storing and transporting articles, comprising:
at least one vertically stackable storage container as specified in any of claims 1–6;
an adjustable rectangular base disposed beneath and supporting said at least one vertically stackable storage container, said base having (i) a horizontally expandable front member, a pair of opposed horizontally expandable side members, and a horizontally expandable rear member; (ii) two L-shaped rear corner brackets joining said rear member with said side members; (iii) two L-shaped front corner brackets joining said front member with said side members; (iv) a pair of wheels, one removably mounted on the side of each of said L-shaped rear corner brackets, to permit rolling movement of said apparatus when tilted; (v) a pair of blocks, one removably mounted beneath each of said L-shaped front corner brackets, to prevent rolling movement of said apparatus when upright; (vi) a receiving slot in the upper surface of said front member and in each of said L-shaped corner brackets, adapted for operative association with said curved members and said connecting components of a superjacent storage container; and (vii) a locking means for releasably securing said base to said at least one vertically stackable storage container; and
an adjustable pulling handle adapted for operative association with said at least one receiving port of the uppermost of said at least one vertically stackable storage container.

8. A combination apparatus for storing and transporting articles as specified in claim 7, further comprising a parts caddy adapted for operative association with and disposed atop the uppermost of said at least one vertically stackable storage container, said caddy having (i) a top surface with the clamps for securing apparatus parts, including said pulling handle and said support members, when they are not being utilized; and (ii) a bottom surface having downward-projecting connecting components manually engageable with said primary receiving slots of the uppermost of said at least one vertically stackable storage container.

9. A combination apparatus for storing and transporting articles, comprising:
- at least three vertically stackable storage containers as specified in any of claims 1–6;
- an adjustable rectangular base disposed beneath and supporting said at least three vertically stackable storage containers, said base having (i) a horizontally expandable front member, a pair of opposed horizontally expandable side members, and a horizontally expandable rear member; (ii) two L-shaped rear corner brackets joining said rear member with said side members; (iii) two L-shaped front corner brackets joining said front member with said side members; (iv) a pair of wheels, one removably mounted on the side of each of said L-shaped rear corner brackets, to permit rolling movement of said apparatus when tilted; (v) a pair of blocks, one removably mounted beneath each of said L-shaped front corner brackets, to prevent rolling movement of said apparatus when upright; (vi) a receiving slot in the upper surface of said front member and in each of said L-shaped corner brackets, adapted for operative association with said curved members and said connecting components of a superjacent storage container; and (vii) a locking means for releasably securing said base to said at least three vertically stackable storage containers;
- an adjustable pulling handle adapted for operative association with said at least one receiving port of the uppermost of said at least three vertically stackable storage containers; and
- a wheeled support means, adapted for operative association with said at least one receiving port of the lowermost two of said at least three vertically stackable storage containers, for stabilizing the apparatus in a tilted orientation during rolling movement.

10. A combination apparatus for storing and transporting articles as specified in claim 9, further comprising a parts caddy adapted for operative association with and disposed atop the uppermost of said at least three vertically stackable storage containers, said caddy having (i) a top surface with the clamps for securing apparatus parts, including said pulling handle and said support members, when they are not being utilized; and (ii) a bottom surface having downward-projecting connecting components manually engageable with said primary receiving slots of the uppermost of said at least three vertically stackable storage containers.

11. A combination apparatus for storing and transporting articles, comprising:
- at least one vertically stackable storage container as specified in any of claims 1–6; and an adjustable rectangular base disposed beneath and supporting said at least one vertically stackable storage container, said base having (i) a horizontally expandable front member, a pair of opposed horizontally expandable side members, and a horizontally expandable rear member; (ii) four L-shaped rear corner brackets joining said front, side, and rear members; (iii) a plurality of wheels mounted beneath said L-shaped corner brackets, to permit rolling movement of said base in an upright orientation;(iv) a receiving slot in the upper surface of said front member and in each of said L-shaped corner brackets, adapted for operative association with said curved members and said connecting components of a superjacent storage container; and (v) a locking means for releasably securing said base to said at least one vertically stackable storage container.

12. A combination apparatus for storing articles, comprising:
- a vertically stackable storage container as specified in any of claims 1–6; and
- a plurality of support members, manually engageable with said secondary receiving slots at the bottom of said storage container, for securely elevating said storage container above the ground surface.

13. A combination apparatus for storing articles, comprising:
- at least two vertically stackable storage containers as specified in any of claims 1–6; and
- a plurality of support members, manually engageable between said secondary receiving slots at the top of a first of said at least two storage containers and said secondary receiving slots at the bottom of a second of said at least two storage containers, for securely elevating said second storage container above said first storage container, said support members having means for suspending said lid of said first storage container to facilitate access to the contents of said first storage container.

* * * * *